United States Patent [19]

Whitaker

[11] Patent Number: 4,809,936
[45] Date of Patent: Mar. 7, 1989

[54] SPACE MODULE ASSEMBLY APPARATUS WITH DOCKING ALIGNMENT FLEXIBILITY AND RESTRAINT

[75] Inventor: Willie D. Whitaker, Canoga Park, Calif.

[73] Assignee: The United States of America as represented by the Administrator of the National Aeronautics and Space Administration, Washington, D.C.

[21] Appl. No.: 105,841

[22] Filed: Oct. 8, 1987

[51] Int. Cl.$^4$ .............................................. B64G 1/64
[52] U.S. Cl. .................................... 244/161; 244/159; 403/51; 285/226
[58] Field of Search .................... 244/158 R, 159, 161; 403/50, 51; 285/226, 114

[56] References Cited

U.S. PATENT DOCUMENTS

| | | | |
|---|---|---|---|
| 1,414,411 | 5/1922 | Herreshoff et al. | |
| 1,569,989 | 1/1926 | Leipert. | |
| 1,605,356 | 11/1926 | Leipert. | |
| 3,084,957 | 4/1963 | Caldwell | 403/51 |
| 3,186,742 | 6/1965 | Frankel et al. | 285/114 |
| 3,910,533 | 10/1975 | Cheatham et al. | 244/161 |
| 3,952,976 | 4/1976 | Fletcher et al. | 244/161 |
| 4,116,018 | 9/1978 | Weible | 64/12 |
| 4,464,138 | 8/1984 | Decker | 464/56 |
| 4,500,057 | 2/1985 | Duwelz | 244/161 |
| 4,556,182 | 12/1985 | Bentall et al. | 248/179 |

FOREIGN PATENT DOCUMENTS 695015  8/1953  United Kingdom ................ 285/114

Primary Examiner—Galen Barefoot
Assistant Examiner—Rodney Corl
Attorney, Agent, or Firm—Edward K. Fein; John R. Manning; Russell E. Schlorff

[57] ABSTRACT

A berthing mechanism especially for use in berthing and compliant air-tight securing between manned space vehicles and modules. The interface is provided by a pair of annular rings, one of which is typically, mechanically attached to the vehicle and the other to the module to which it is to be docked and secured. One of the two rings is attached to a base by a resilient bellows. The facing surface of one annular ring is joined to a base by a cable laced through alternating pulleys attached circumferentially so that the interface surface of that ring may be tilted to accommodate angular misalignment as said annular rings are brought into docking (berthing) contact. Interleaving guide flanges with chamfered sides provide at least some rotational misalignment correction. A plurality of electro-mechanical actuator/attenuator units provide means for extending one annular ring toward the other in the final stages of docking, for absorbing initial docking shock and for drawing the annular rings into tight interface contact. Locking hooks provide for securing the interfaces.

11 Claims, 3 Drawing Sheets

SPACE MODULE ASSEMBLY APPARATUS WITH DOCKING ALIGNMENT FLEXIBILITY AND RESTRAINT

ORIGIN OF THE INVENTION

The invention described herein was made in the performance of work under a NASA contract and is subject to the provisions of section 305 of the National Aeronautics and Space Act of 1958, Public Law 58-568 (72 Stat. 435; 42 U.S.C. 2457).

BACKGROUND OF THE INVENTION

1. Field of the Invention

The invention relates to assembly of manned space component modules and nodes from space travel vehicles into space stations. More specifically, the invention relates to structures for misalignment compensation during the final stages of docking (berthing) in the process of assembling such components into a multi-component space station, and thereafter due to thermal and other effects.

2. Background Art

The procedure whereby space components such as habitation modules, nodes and space vehicles are brought together and assembled to form a space station is referred to in the space industry as docking or berthing. The problem of misalignment in the final stages of that procedure is recognized and various attempts to correct for it have been devised.

Basically, an off axis or angular misalignment between components to be assembled in space is not easily corrected as would be the case for an assembly on the ground or between components with aerodynamic (airfoil) controls in the atmosphere. Accordingly, it is necessary that self-correcting means be provided so that alignment can be achieved on contact.

In the space component docking situation, the parallel mating of two interfacing surfaces is to be achieved so that clamping or otherwise securing of those surfaces can be accomplished.

One prior art concept involves the use of the standard universal joint (gimbal). That concept is very common and well known for coupling rotating elements which are not aligned perfectly, i.e., are not coaxial.

In the space situation, rotational coupling is not involved, rather an interface surface associated with one component (module, etc.) must be self aligning when contacted by another such surface associated with the component to be docked thereto as it approaches in the final stages of the docking procedure. The structure of the prior art gimbal includes two yokes and two pairs of short mutually orthogonal shafts as hinge points. The gimbal shafts and their bearings are all subjected to the very large shear forces resulting from pressurization of the modules and nodes assembled into a space station, particularly since the inter-module passages created by docking and securing are of substantial diameter. The result is that a high strength design is required, resulting in very substantial weight.

The state of the art in respect to flexible couplings and universal joints is mostly directed to the problem of rotating member couplings. Typical of that art are U.S. Pat. No. 1,414,411 to Herreshoff et al; U.S. Pat. No. 1,569,989 to Leipert; U.S. Pat. No. 1,605,356 to Leipert and U.S. Pat. No. 4,116,018 to Weible. While it may be said that any of those disclosures could be adapted to the space vehicle environment, none is readily adapted to the air-tight coupling required and none is well adapted to a practical combination including a bellows for pressure containment.

U.S. Pat. No. 4,556,182 to Bentall et al, discloses an arrangement including two mutually rotatable elements each having inclined plane faces such that rotation of one such element about a central axis causes an end face perpendicular to the central axis to assume a tilt variable over 360°. The Bentall device is not adapted to assume an interface plane orientation upon axial contact as required by the space docking requirement.

A very important aspect of the requirement is that of resistance to the very large axial separation force caused by pressurization.

None of the aforementioned disclosures, nor the duct system flexible joint of U.S. Pat. No. 3,186,742 to Frankel et al affords that feature.

SUMMARY OF THE INVENTION

It may be said to have been the general objective of the invention to provide a space component (module, node or the like) docking and securing apparatus which is self aligning on contact during the final stages of docking, is resistant to large axial separation forces and is light in weight and inexpensively constructed.

The basic flexibility control combination according to the invention comprises a generally cylindrical, axially resilient, air-tight bellows and a plurality of circumferentially spaced pulleys mounted on the structures connected to each axial end of the bellows. The pulleys (first set) associated with the structure at one axial end of said bellows are circumferentially staggered with respect to those associated with the opposite facing structure at the other axial end of said bellows (second pulley set). A continuous or semi-continuous cable is laced through the pulleys, passing alternately over a given pulley in the first set and then over an interleaved pulley in the second set before engaging the next adjacent pulley in the first set. The shape of the cable is thus serpentine. Since the cable length is invariant and is continuous or semi-continuous, axial deflection of the structure at a point about one axial end of the bellows produces an equal and opposite deflection of a point on the structure at the 180° point circumferentially. Since the axial forces of pressurization are distributed over the multiple pulley locations, the pulley attachment structure, especially the tilt responsive annular ring which interfaces with its opposite number on the approaching module need not be nearly as strong and heavy as is required in a gimbal implementation.

Ancillary features of the combination include guide flanges with chamfered edges for compensating rotational misalignment and a plurality of actuator/attenuator units for extending one of the interface rings and for shock absorption upon contact.

The details of a preferred embodiment of the novel concepts are hereinafter described.

DETAILED DESCRIPTION OF THE PREFERRED EMBODIMENT

Figures 1, 3:
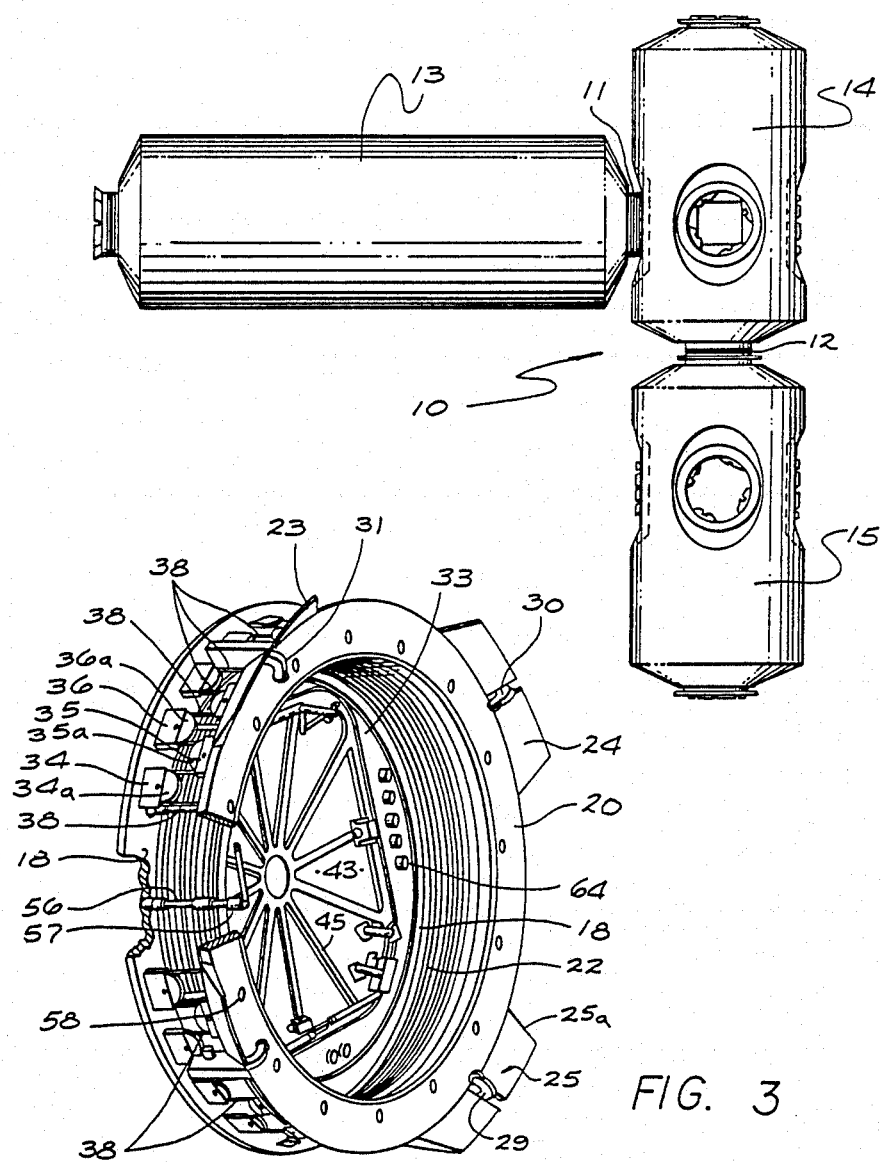
FIG. 1 is a pictorial of a partially assembled space station employing the invention as the inter-module connections.
FIG. 3 is a more detailed pictorial of the assembly containing the cable and pulley arrangement and other features according to the invention.

Referring now to FIG. 1, a partially assembled, manned, space station 10 is illustrated showing typical assembly interface apparatus 11 and 12. The individual module 13 and nodes 14 and 15 of the FIG. 1 arrangement are thus secured together individually as they are delivered into orbit by a space vehicle such as the so-called "shuttle" which is now well known in the extra terrestial vehicle art. As indicated hereinbefore, the air-tight passage thus formed between nodes and modules permits crew traverse among the assembled modules.

Figure 2:
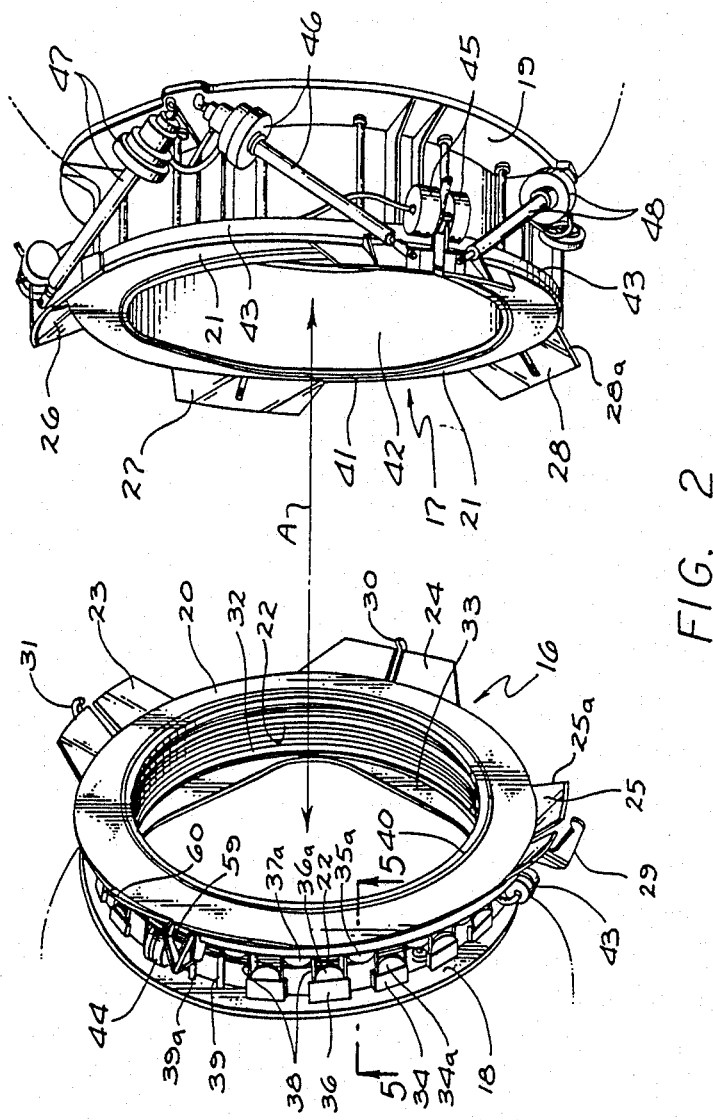
FIG. 2 is a pictorial illustrating the assemblies associated with approaching modules to be docked (berthed) and affixed together as contemplated in FIG. 1.

In FIG. 2, a detailed pictorial drawing illustrates the two major assemblies 16 and 17, each of which is to be understood to be mounted onto a selected one of the two modules or nodes to be docked and secured to each other, such as nodes 14 and 15, for example, shown in FIG. 1.

In assembly 16 there is a base annular (flange) ring 18 which is permanently affixed to one of the modules to be mated and secured together, and in assembly 17 there is a similar base annular ring (flange) 19 affixed in a comparable manner to the other module. There are also interface annular rings 20 and 21 which ultimately are positoned in flat planar contact against each other, both then being substantially coaxial with respect to the axis A.

Since a degree of misalignment is to be expected as the interface rings 20 and 21 approach each other, it will be realized that the initial contact between interface rings 20 and 21 during docking approach is likely to be a point contact at some location about the circumferential dimensions of rings 20 and 21. This is the result of the interface planes of rings 20 and 21 not being initially parallel. At this time, the flexible restraint structure according to the invention allows the ring 20 to tilt so that its interface plane becomes substantially parallel to that of ring 21 of assembly 17 as the closure proceeds.

After the initial point contact between rings 20 and 21, ring 20 deflects toward base ring 18 at the point of initial contact and a circumferentially opposed (180° opposite) point on ring 20 rises, i.e. increases its distance from base ring 18. This effect is achieved by the unique structure according to the invention. A limited deflection pressurizable bellows 22 evident at base ring 18 on FIG. 2 is attached at one axial end to base ring 18, at its other end to interface ring 20, and is capable of accomodating the interface plane tilt of ring 20 resulting from a "tilted axis" approach between rings 20 and 21. This tilt of the interface plane of ring 20 may be seen to be (ideally) eliminated when assembly 16 is locked to assembly 17, but may be permitted to remain at least partially tilted to allow for assembly tolerances and mismatch in an arrangement such as in FIG. 1, provided rings 20 and 21 are in firm contact.

Guide flanges 23, 24 and 25 on ring 20 and guide flanges 26, 27 and 28 on ring 21 afford rotational alignment about axis A to achieve predetermined rotational alignment between assemblies 16 and 17. A further view of these guide flanges circumferentially meshed is afforded in FIG. 4 as will be explained subsequently. Securing hooks, typically, 59, 29, 30 or 31 will be understood to hold rings 20 and 21 in contact.

It will be noted that an inner cylindrical member 32 firmly attached to a flange 18 is shown internal to the bellows 22 in assembly 16 in FIG. 2. The flange 18 affords attachment for an air seal hatch which is shown in FIG. 3 (to be described). Such a hatch is obviously required when the mating assembly 17 is not attached and when the module or vehicle to which it is affixed is in the vacuum environment of space.

The most significant element of the described combination is the cable and pulley arrangement for accomodating misalignment at the interface between rings 20 and 21 during docking approach. A plurality of circumferentially spaced pulley housings such as 34 and 36, about the inside surface of base ring 18, are attached to the base ring 18 as will be seen in assembly 16 of FIG. 2. Each such housing supports a shaft for a pulley contained therein, typically pulleys 34a and 36a. A similar circumferentially spaced plurality of pulley housings 35 typically, and pulleys 35a typically, is deployed around the interface ring 20 inside surface (facing ring 18). These interface ring pulleys, such as pulleys 34a and 36a, are equal in number to those attached to base ring 18, but are interleaved circumferentially as indicated on FIG. 2 assembly 16. (see also FIG. 3). A cable 38 is laced in a serpentine configuration among the pulleys. That is, cable 38 passes around each pulley 34a, for example, and then over the next opposing interleaved pulley 35a, for example, before engaging pulley 36a. The cable 38 may be continuous, but as contemplated in FIG. 2, is shown anchored to base ring 18 through sleeves 39 and 39a. This configuration, in lieu of a continuous cable, affords greater ease of assembly and will be seen to function the same as a continuous cable.

It will be realized that the circumferential spacing of the pullies need not be such that the cable spans between pulleys are parallel. A larger circumferential spacing of pulleys would cause these cable spans to form a series of acute angles.

The further description of the elements of FIG. 2 will be undertaken in connection with FIG. 3 where the cable, pulley and bellows elements are more clearly evident.

In FIG. 3, the cable 38 is depicted as though it were continuous, which is to be regarded as a variation on FIG. 2. Furthermore, in FIG. 3 the latch 43 with ribs 45 is shown in place against flange 33 (see also FIG. 2, assembly 16). Typical utility connections (air, electricity, etc.) 64, facilitate the functional interconnection of a space station module 13 (FIG. 1) and a node 14, for example.

The base ring 18 and interface ring 20 are shown partially cut away in FIG. 3 to illustrate an auxillary but optional structure 56 which provides a lock-down of interface rings from inside the mated assemblies, i.e. from inside a module or node. This structure, which can be extant at several locations circumferentially, acts as a compression jack screw anchored to ring 18 at one end, extends through holes such as 58, and has a shoulder 57 which abuts over ring 20 to at least partially compress bellows 22. The bellows 22 is preferably fabricated from a light weight but strong and resilient material able to assume asymetric compression. A protective cylindrical section (now shown) may be installed on the inside of assembly 16 to serve as a protective device for the bellows 22 inside diameter surface during passage by personnel and equipment during normal use and operation.

Figure 4:
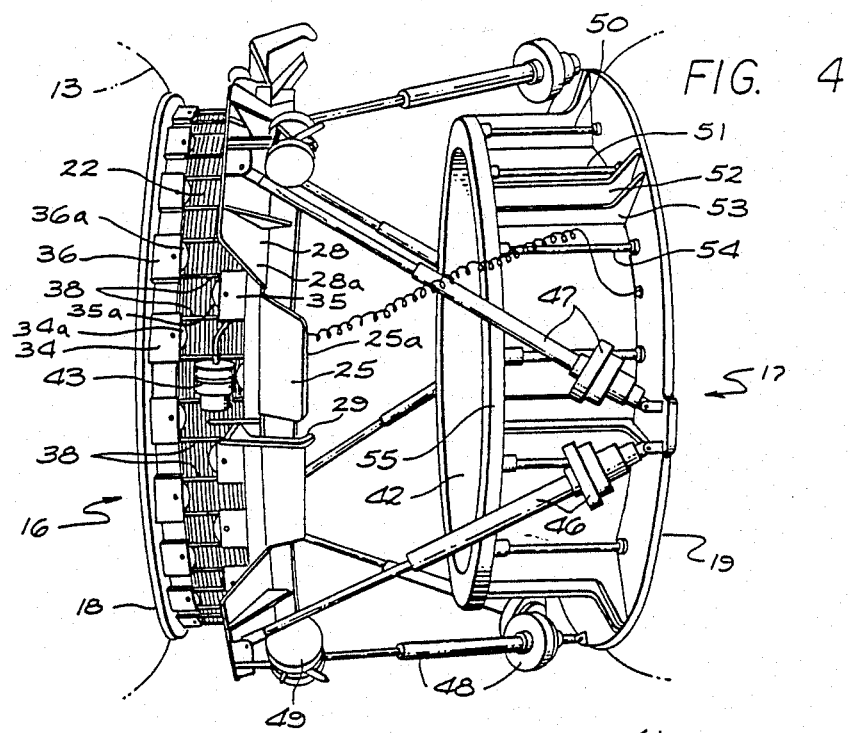
FIG. 4 illustrates the extension of one of the interface rings to berthing engagement with the interface ring of the assembly of FIG. 3.

In FIG. 2 and 4 a plurality of electro-mechanical actuator/attenuator units 46, 47, 48 are shown. These units are controlled manually or otherwise to extend as shown in FIG. 4 to thrust the interface ring 21 and associated elements outward from the base structure comprising base ring 19 and cylinder 42. This base structure further includes structural braces and tension members 50, 51, 52, 53 and 54 securing the rim 55. The actuators 46, 47 and 48 are controllable to assist in placing the interface ring 21 and its associate parts against interface ring 20 during a docking approach. These actuators 46, 47 and 48 and other circumferentially spaced also act as impact shock absorbers.

Figure 5:
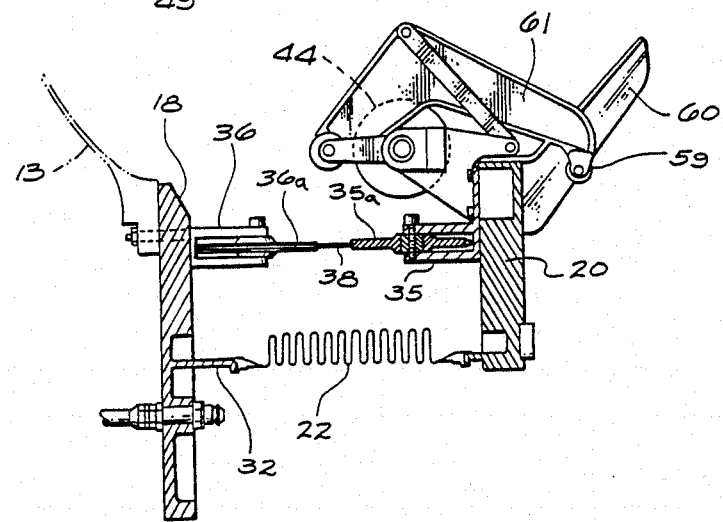
FIG. 5 is cross-sectional detail as identified from FIG. 2 showing the bellows, pulley and cable and a typical locking hook in detail.

FIG. 5 shows a cross-section of the assembly 16 taken as identified on FIG. 2. The bellows 22 is shown firmly attached, in air-tight fashion, between interface ring 20 including cylindrical member 32 and base ring 18. Cable 38 is also seen passing over typical pulleys 35a and 36a. The various hook elements 59 illustrated operate to lock the interface rings 20 and 21 together when docking is completed. The presence of a roller on the extremity of hook 59 is a variation vis-a-vis other hook elements illustrated in other figures. The operation of hook 59 is through the slot in flange 60. The mechanism 61 and associated motor/actuator 44 are, of course, subject to variation based on the understood function.

The identification of elements by numeral is consistent from figure to figure.

OPERATION

As a docking (berthing) operation proceeds, the components of the novel combination approach each other as depicted in FIG. 2. The space modules or vehicles to which the assemblies 16 and 17 are affixed are not shown in FIG. 2. However, it should be understood that one is attached to base ring 18 of assembly 16 (on the left according to FIG. 2) and the other attached to the assembly 17 base ring 19 (on the right in FIG. 2). At the approach closes, the actuators 46, 47, 48 etc. are operated to extend the interface ring 21 toward assembly 16. In FIG. 4 the interface ring 21 thus extended has contacted the interface ring 20 of assembly 16. Assuming misalignment of the type in which the planes of interface rings 20 and 21 are not initially parallel, the initial contact is at substantially only one point about the surfaces of rings 20 and 21. That contact depresses ring 20 and, since the length of cable 38 is constant, results in elevation of ring 20 at a point 180° from the point of contact. However, the mean spacing between rings 18 and 20 about all cicumferential points remains constant as interface ring 20 thus tilts. The resilience of bellows 22 tends to aid in boosting the 180° point of ring 20 circumference. The bellows 22 can be under at least some nominal axial compression which tends to keep the cable 38 taut and, therefore, the bellows augments the aforementioned tilt adjustment. The result is that further advance of the assembly 17 brings interface rings 20 and 21 into parallel alignment and contact. Limited rotational misalignment is compensated by chamfered edges 25a and 28a, typically, on interleaving guide flanges 25 and 28, attached to assemblies 16 and 17. (FIG. 4), respectively.

The actuator/attenuators 46, 47, 48 etc. act as shock absorbers during the docking (berthing) procedure and can shortly thereafter be retracted to bring the assemblies 16 and 17 together in their entireties, the hooks such as hooks 29, 30 and 31 being activated to grip the rim 43 of assembly 17. Seals 40 and 41 are typical of those required wherever a pressurized air tight seal is required, as it is in the described arrangement.

The aforementioned actuator/attenuator units may also provide a "kick-off" boost whenever separation of modules/nodes which had been joined, is required. Still further, some degree of lateral misalignment compensation can be effected by control of these actuator units.

It will be realized from the foregoing that, in view of the distributed cable-pulley configuration, the interface rings experience distributed loads, from the pressurization force tending to pull the interface apart. This makes it possible to use metal of lesser cross-section for the interface rings than required when the prior art gimbal (universal joint) is employed. Moreover, the weight of the cable and pulley assembly with interface rings and associated parts is typically on the order of 74 lbs. vs. 800 lbs. for the prior art gimbal arrangement. The advantage of the combination according to the invention is, therefore, obvious from a weight standpoint alone. The weight comparison relates to a device with an interface ring outside diameter of 80 inches having a 63 inch diameter bellows.

The selection of suitable materials for construction of the combination according to the invention is readily accomplished by the person of skill in this art.

A braided stainless steel cable, ministranded and of 3/16 inches diameter was found to be suitable for apparatus of the size aforementioned. In view of the distributed force pattern effected by the cable and pulley arrangement of the invention, the separation force, which is typically at least 100,000 lbs., due to pressurization is adequately resisted.

If desired, duplicate multiple cables can be employed with multi-track pulleys or separate adjacent pulleys for redundancy or for larger structures.

It will be evident after the invention is well understood that uses other than in connection with space station/vehicles are readily possible wherever a docking or mating misalignment is extant and interface misalignments must be compensated.

The retention of a stable average spacing of all circumferential points between interface ring 20 and base ring 18 contributes greatly to the stability of a space station assembly, particularly where additional modules such as depicted in FIG. 1 are provided to form a closed loop or 'racetrack' configuration. A space station orbiting the earth at a typical orbital period of ninety minutes may experience wide surface temperature exursions between sun illuminated and shadowed surfaces. The resultant alignment variations are readily absorbed by the apparatus according to the invention. In particular, it is emphasized that, in a space station assembly the plane of interface ring 20 will not necessarily be parallel to the plane of base ring 18, nor are the axial centerlines of these rings necessarily completely coaxial.

From a conceptual understanding of the invention, the skilled practitioner can envision a variation providing stabilized closure restraint rather than separation restraint as provided for the space station configuration. Such a variation could, for example, be implemented by extending a plurality of circumferentially spaced rods axially from ring interface 21 (FIG. 3), through clearance holes in to an extra ring between base ring 18 and interface ring 20, along with and placement of the pulley and cable apparatus between ring 20 and this additional ring. Such a variation would not be applicable to the described space station application, unless a need were extant for closure force containment in the converse sense vis-a-vis the separation resistance of the described apparatus.

An alternative application for the invention is seen in the field of transmission pipeline systems, for example, for natural gas transmission lines. Here, above ground lines are subject to various conditions of temperature change and seismic activity, for example, requiring flexibility at pipe joints. Accordingly, the inventive concept extends beyond space module berthing, per se.

It is to be understood that other modifications falling within the teachings of the invention may be made by those of skill in this art. Accordingly, it is not intended that the scope of the invention is limited by the drawings or this description, but only by the claims which follow. The drawings and this description are intended to be typical and illustrative only.

The term "serpentine" refers to the cable 38 shape as is alternately passes around the individual pulleys of the first array 34a, 36a, etc. and over alternate pulleys of the second array 35a, 37a, etc. The term "module" as used hereinafter is intended to include components known in the aerospace industry as habitation modules, nodes and space vehicles. The term "berthing" is used hereinafter to describe the procedure also alternatively called docking in the foregoing description.

The axis of a module as referred to herein means the axis passing through the interface rings of the described module assembly apparatus. Accordingly, this axis for module 13 is the same as the lengthwise axis of the module. However, for module 14, it is transverse to the lengthwise axis of module 14 (see FIG. 1).

I claim:

1. A system for effecting space module berthing and compliant, pressure tight connection between first and second modules and for compensating misalignment between the axes of said modules, comprising:
   a planar first interface annular ring associated with said first module and in a plane substantially normal to the axis of said first module; an axially resilient, generally cylindrical member associated at a first axial end thereof with the structure of said second module structure as a base therefor, and a second planar interface annular ring attached at its inside diameter to said resilient cylindrical member at the second axial end thereof generally facing said first planar interface annular ring on berthing approach;
   a self adjusting axial force resistant arrangement radially external to said resilient cylindrical member comprising a first array of spaced circumferentially distributed pulleys attached to the structure of said second planar interface annular ring facing toward said second module base, a second array of spaced circumferentially distributed pulleys attached to said second modular structure base generally facing said first array of pulleys and a serpentine cable laced over each first pulley of said first array, thereafter over the next adjacent pulley of said second array and thence over the next adjacent first pulley, seriatim, whereby said resilient member deflects to tilt said second planar interface annular ring upon contact with said first planar interface annular ring to align said second planar annular ring generally parallel to said first planar annular ring.

2. The combination according to claim 1 further defined in that said cable is defined as continuous, whereby said tilting of said second planar interface annular ring produces movement of a radially opposite point on said second interface annular ring of opposite sense in response to deflection of said second interface annular ring resulting from initial point contact between said first and second interface annular ring as a result of said annular misalignment during berthing.

3. The combination according to claim 1 further defined in that said cable is defined as semi-continuous, said cable being continuous over said pulleys but having two ends thereof anchored in close proximity between adjacent pulleys of one of said two arrays of pulleys.

4. The combination according to claim 1 in which said pulleys of said second array are circumferentially staggered whereby each pulley of one array interleaves between adjacent first array pulleys.

5. The combination according to claim 4 further defined in that said cable is defined as continuous, whereby said tilting of said second planar interface annular ring produces movement of a radially opposite point on said second interface annular ring of opposite sense in response to deflection of said second interface annular ring resulting from initial point contact between said first and second interface annular rings as a result of said annular misalignment during berthing.

6. The combination according to claim 4 further defined in that said cable is defined as semi-continuous, said cable being continuous over said pulleys but having two ends thereof anchored in close proximity between adjacent pulleys of one of said two arrays of pulleys.

7. The combination according to claim 1 in which said resilient cylindrical means is a cylindrical bellows thereby providing axial resilience and lateral resilience at said second axial end thereof.

8. The combination according to claim 7 further defined in that said cable is defined as continuous, whereby said tilting of said second planar interface annular ring produces movement of a radially opposite point on said second interface annular ring of opposite sense in response to deflection of said second interface annular ring resulting from initial point contact between said first and second interface annular rings as a result of said annular misalignment during berthing.

9. The combination according to claim 7 further defined in that said cable is defined as semi-continuous, said cable being continuous over said pulleys, but having two ends thereof anchored in close proximity between adjacent pullies of one of said two arrays of pulleys.

10. The combination according to claim 4 in which said resilient cylindrical means is a cylindrical bellows thereby providing axial resilience and lateral resilience at said second axial end thereof.

11. The combination according to claim 7 in which said pulleys of said second array are circumferentially staggered whereby each pulley of one array interleaves between adjacent first array pulleys.

* * * * *